United States Patent
Agnihotram et al.

(10) Patent No.: US 10,733,457 B1
(45) Date of Patent: Aug. 4, 2020

(54) METHOD AND SYSTEM FOR PREDICTING IN REAL-TIME ONE OR MORE POTENTIAL THREATS IN VIDEO SURVEILLANCE

(71) Applicant: Wipro Limited, Bangalore (IN)

(72) Inventors: Gopichand Agnihotram, Bangalore (IN); Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/359,015

(22) Filed: Mar. 20, 2019

(30) Foreign Application Priority Data

Mar. 11, 2019 (IN) .............................. 201941009418

(51) Int. Cl.
*G06K 9/00* (2006.01)
*G06K 9/62* (2006.01)
*G08B 13/196* (2006.01)
*G06K 9/72* (2006.01)
*H04N 7/18* (2006.01)

(52) U.S. Cl.
CPC ..... *G06K 9/00771* (2013.01); *G06K 9/00718* (2013.01); *G06K 9/6256* (2013.01); *G06K 9/72* (2013.01); *G08B 13/196* (2013.01); *H04N 7/18* (2013.01)

(58) Field of Classification Search
CPC ........... G06K 9/00771; G06K 9/00718; G06K 9/6256; G06K 9/72; G08B 13/196; H04N 7/18
See application file for complete search history.

(56) References Cited

U.S. PATENT DOCUMENTS

| | | | |
|---|---|---|---|
| RE44,527 E | 10/2013 | Aviv | |
| 9,269,374 B1 * | 2/2016 | Conway | ............ G06K 9/00302 |
| 9,710,708 B1 | 7/2017 | Checka | |
| 2008/0193010 A1 | 8/2008 | Eaton et al. | |

(Continued)

FOREIGN PATENT DOCUMENTS

CN          106295565 A          1/2017

OTHER PUBLICATIONS

European Search Report issued in the European Patent Office in counterpart European Application No. 19165643.8 dated Nov. 6, 2019. 8 pages.

*Primary Examiner* — Michael E Teitelbaum

(74) *Attorney, Agent, or Firm* — Finnegan, Henderson, Farabow, Garrett & Dunner, LLP

(57) ABSTRACT

The present disclosure discloses a method and a threat prediction system for predicting one or more potential threats in video surveillance. The threat prediction system receives real-time video feed from video surveillance system and identifies one or more objects in a plurality of frames obtained from video feed. A scene description for each of plurality of frames is generated based on one or more objects and context associated with corresponding frames. One or more real-time actions are determined for scene based on scene description. Based on one or more real-time actions, the threat prediction system predicts one or more potential threats associated with the video feed and alerts user of the one or more potential threats based on the prediction. The present disclosure predicts one or more possible threats which may happen in near future and helps in understanding future damage and raise alerts to take preventive actions to control damage.

11 Claims, 6 Drawing Sheets

(56) References Cited

U.S. PATENT DOCUMENTS

| | | |
|---|---|---|
| 2008/0201116 A1 | 8/2008 | Ozdemir et al. |
| 2013/0129307 A1 | 5/2013 | Choe et al. |
| 2017/0364766 A1* | 12/2017 | Das .................... G06K 9/00664 |
| 2018/0165934 A1 | 6/2018 | Pan et al. |
| 2018/0314897 A1 | 11/2018 | Camilus et al. |

* cited by examiner

METHOD AND SYSTEM FOR PREDICTING IN REAL-TIME ONE OR MORE POTENTIAL THREATS IN VIDEO SURVEILLANCE

TECHNICAL FIELD

The present subject matter is related in general to video surveillance and security system, more particularly, but not exclusively to a method and a system for predicting in real time one or more potential threats in video surveillance.

BACKGROUND

Nowadays, security and surveillance systems play a very crucial role in public places, offices, retails shops, shopping malls and other places of importance for taking enhanced security measures. Today, security and law enforcement agencies invest huge efforts and resources in anticipating and preventing any harm and attacks to users. However, the security agencies and surveillance systems lack in providing prior information relating to any threats. Though some warning systems such as fire and hazards exist for alerting the users, such systems are not capable of generating warning for human threats. These days' people outside home environment are increasingly subjected to threats and attacks of various forms by other fellow human beings.

Some of the existing mechanisms for surveillance system and threat prediction may use a comparison of earlier recorded actions of individuals with real-time situations to determine possible threats. Other existing systems may use sampled movements and performs a comparison with characteristics of movements which are indicative of individuals having a criminal intent or performs behaviour pattern analysis based on a criminality prediction model. Some other existing systems may generate threat predictions by detecting and identifying object in video and assessing relevance to a threat.

However, such existing systems do not solve the issue of predicting an intention of the person approaching with criminal intent. For example, in a normal street corner, existing systems can generate alert on identifying an object which can be a possible threat, such as a weapon. However, not all personnel wielding a weapon poses a threat, for instance, law enforcement agents. Therefore, from an implementation perspective, such existing systems have unreasonable levels of false positives. On the other hand, in another example, identifying movement patterns of people around a secure establishment such as a bank, and identification of anomalous movement or behaviour in the context of the scene is important. For instance, all vehicles parked with drivers and engine running in front of the bank may not in isolation mean a possible threatening situation. However, when a few people are seen exiting the vehicle with behavioural anomalies, then a possible threatening situation needs to be considered. Further, existing systems do not create a probable prior scene description, describing near future happening in order to warn concerned person or another person in advance to prevent any casualty.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for predicting in real-time one or more potential threats in video surveillance. The method includes receiving a real-time video feed from a video surveillance system. The video feed includes a plurality of frames associated with a scene captured at a location of the video surveillance system. The method includes identifying one or more objects in each of the plurality of frames. Each of the one or more objects is sequenced with respect to the received plurality of frames. A scene description is generated for each of the plurality of frames based on the one or more objects and context associated with corresponding frames. The scene description includes sentences describing the scene and gestures, and the context includes sentences describing the scene along with emotions associated with a user, wherein the user is associated with the one or more objects in the corresponding frames. Further, the method includes determining one or more real-time actions for the scene based on the scene description and predicting one or more potential threats to the user associated with the video feed based on the one or more real-time actions. Thereafter, alerting the user of the one or more potential threats based on the prediction.

In an embodiment, the present disclosure may relate to a threat prediction system for predicting in real time one or more potential threats in video surveillance. The threat prediction system may include a processor and a memory communicatively coupled to the processor, where the memory stores processor executable instructions, which, on execution, may cause the threat prediction system to receive a real-time video feed from a video surveillance system. The video feed includes a plurality of frames associated with a scene captured at a location of the video surveillance system. The threat prediction system identifies one or more objects in each of the plurality of frames. Each of the one or more objects is sequenced with respect to the received plurality of frames. Further, a scene description is generated for each of the plurality of frames based on the one or more objects and context associated with corresponding frames. The scene description includes sentences describing the scene and gestures, and the context includes sentences describing the scene along with emotions associated with a user, wherein the user is associated with the one or more objects in the corresponding frames. Further, based on the scene description, one or more real-time actions is determined for the scene. Thereafter, the threat prediction system predicts one or more potential threats to the user associated with the video feed based on the one or more real-time actions and alerts the user of the one or more potential threats based on the prediction.

In an embodiment, the present disclosure relates to a non-transitory computer readable medium including instructions stored thereon that when processed by at least one processor may cause a threat prediction system to receive a real-time video feed from a video surveillance system. The video feed includes a plurality of frames associated with a scene captured at a location of the video surveillance system. The instruction causes the processor to identify one or more objects in each of the plurality of frames. Each of the one or more objects is sequenced with respect to the received plurality of frames. Further, a scene description is generated for each of the plurality of frames based on the one or more objects and context associated with corresponding frames. The scene description includes sentences describing the scene and gestures, and the context includes sentences describing the scene along with emotions associated with a user, wherein the user is associated with the one or more objects in the corresponding frames. Further, based on the scene description, the instruction causes the processor to determine one or more real-time actions for the scene.

Thereafter, the instruction causes the processor to predict one or more potential threats to the user associated with the video feed based on the one or more real-time actions and alert the user of the one or more potential threats based on the prediction.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
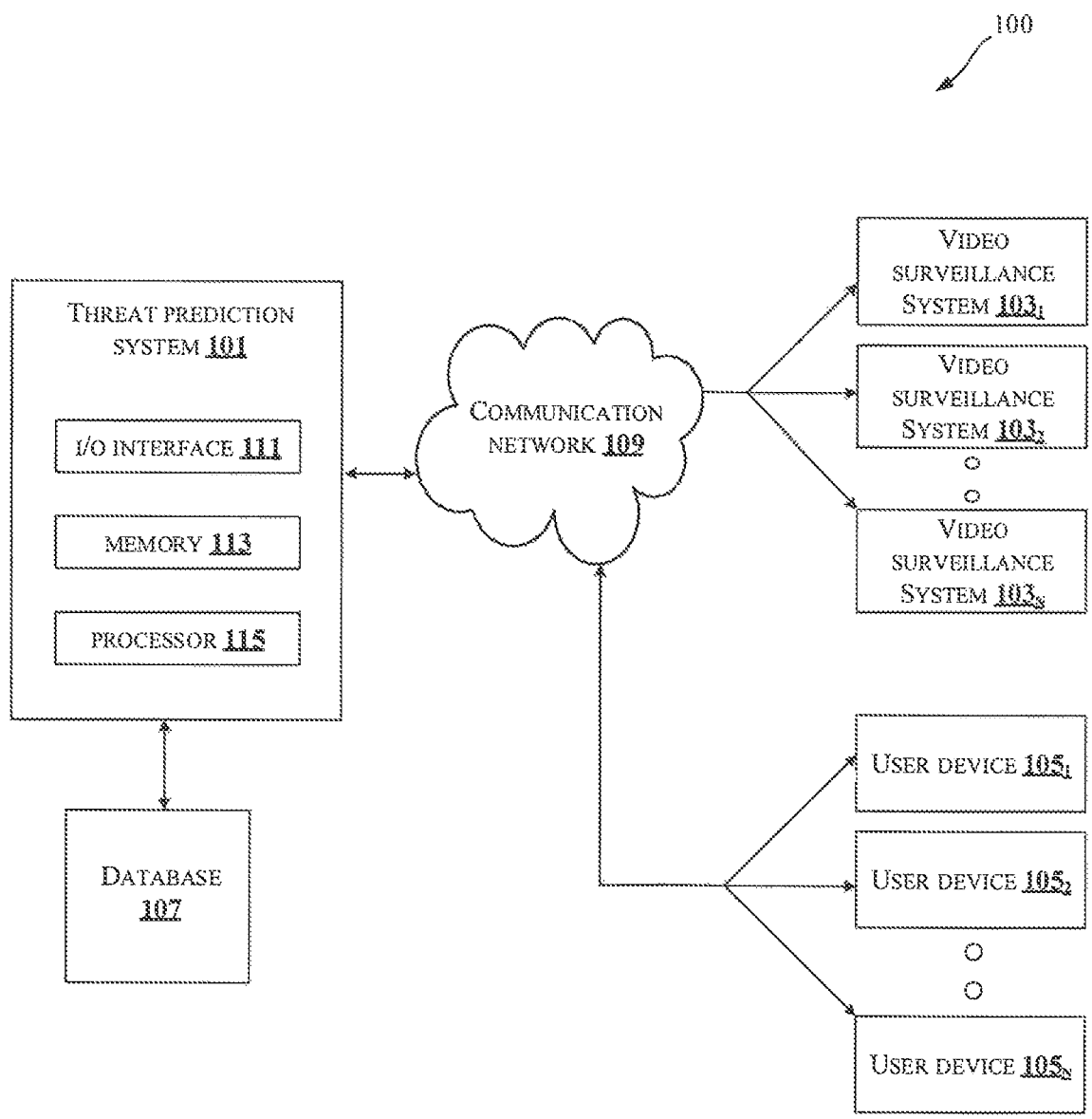
FIG. 1 illustrates an exemplary environment for predicting in real-time one or more potential threats in video surveillance in accordance with some embodiments of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relate to a method and a threat prediction system for predicting one or more potential threats in real-time in video surveillance. In an embodiment, the video surveillance may refer to monitoring of behaviour, activities, or other changing information for purpose of influencing, managing, directing, or protecting people from a distance by means of electronic systems, such as Closed-Circuit Television (CCTV) cameras. Particularly, knowing the real intentions of people in the surrounding is difficult. The intention may help in disclosing future actions of the people, which are important in real-time prediction of possible threats. Typically, systems in such surrounding may not be able to determine intention of the people in the scene and thus may not be able to identify possible threats to users in the near future. The present disclosure in such case may use video feed and associated plurality of frames from database to train one or more neural network models with a sequence of actions associated with the plurality of frames. The trained one or more neural network models may be deployed in multiple safety concerned places to observe and predict real-time threats in advance. The present disclosure in real-time may involve generating a scene description of each plurality of frames obtained in real-time based on context and one or more objects detected in the plurality of frames. In an embodiment, the scene description includes sentences describing the scene captured in real-time and gestures, and the context may describe the scene along with emotions associated with a user, wherein the user is associated with the one or more objects. One or more real-time actions for the scene may be determined which helps in predicting one or more potential threats to the user associated with the video feed. The present disclosure predicts one or more possible threats which may happen in the near future and helps in understanding future damage and raise alerts in order to take preventive steps to control the damage.

FIG. 1 illustrates an exemplary environment for predicting in real time one or more potential threats in video surveillance in accordance with some embodiments of the present disclosure.

As shown in FIG. 1, an environment 100 includes a threat prediction system 101 connected through a communication network 109 to a video surveillance system $103_1$, a video surveillance system $103_2$, . . . and a video surveillance system $103_N$ (collectively referred as plurality of video surveillance systems 103) and a user device $105_1$, a user device $105_2$, . . . and a user device 105N (collectively referred as plurality of user devices 105). Further, the threat prediction system 101 may also be connected to a database 107. In an embodiment, the plurality of video surveillance systems 103 may refer to a system used for monitoring any surrounding and is capable of capturing images and videos which may be compressed, stored or transmitted over a communication network 109. The plurality of video surveillance systems 103 may be, for example, Closed Circuit Television (CCTV) cameras. A person skilled in the art would understand that any other type of sensors not mentioned explicitly herein may also be used for monitoring the environment. The plurality of user devices 105 may be associated with users who may have installed a video surveillance system of the plurality of video surveillance systems 103 in a scene. In an embodiment, the plurality of user devices 105 may include but is not limited to, a laptop, a desktop computer, a Personal Digital Assistant (PDA), a notebook, a smartphone, IOT devices, a tablet, a server, and any other computing devices. A person skilled in the art would understand that any other devices, not mentioned explicitly, may also be used as the plurality of user devices 105 in the present disclosure. In an embodiment, the scene may depend on environment in which the plurality of video surveillance systems 103 is installed. For instance, the scene may be of a house, an office, a secure establishment such as banks, stadium, airports and the like. Accordingly, the users associated with the plurality of user devices 105 may vary based on the scene.

The threat prediction system 101 may provide one or more possible threats to users in advance in real-time. In an embodiment, a threat is a situation or an activity by a person which may cause serious harm or danger to the users. Particularly, the threat may indicate an approaching or imminent menace to the users. In an embodiment, the threat prediction system 101 may exchange data with other components and service providers (not shown explicitly in FIG. 1) using the communication network 109. The communication network 109 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like. In one embodiment, the threat prediction system 101 may include, but is not limited to, a laptop, a desktop computer, a Personal Digital Assistant (PDA), a notebook, a smartphone, IOT devices, a tablet, a server, and any other computing devices. A person skilled in the art would understand that, any other device, not mentioned explicitly, may also be used as the threat prediction system 101 in the present disclosure. Further, the threat prediction system 101 may include an I/O interface 111, a memory 113 and a processor 115. The I/O interface 111 may be configured to receive the real-time video feed from the plurality of video surveillance systems 103. The real-time video feed received from the I/O interface 111 may be stored in the memory 113. The memory 113 may be communicatively coupled to the processor 115 of the threat prediction system 101. The memory 113 may also store processor-executable instructions which may cause the processor 115 to execute the instructions for predicting in real-time one or more potential threats in video surveillance.

Further, the threat prediction system 101 includes a plurality of neural network models which may be trained using a plurality of video training feeds associated with different scenes. The database 107 may contain the plurality of video training feeds which includes a sequence of frames associated with each video training feed. The plurality of neural network models may include an object detection model, a scene description model, an action prediction model, and a threat prediction model. In an embodiment, each of the plurality of neural network models may be trained using sequential modelling. In an embodiment, the object detection model may be trained based on a plurality of training objects identified manually from the sequence of frames of the video training feeds using convolution neural network technique. For instance, the plurality of training objects may be a knife, human, any weapon, and any other components.

The scene description model may be trained using the plurality of training objects. Particularly, the scene description model may describe the scene of each sequential frame. For instance, if a knife and a human is present in the frame, the scene may be described as human holds the knife in hand, which may be considered as an action. Further, the action prediction model may be trained using a plurality of actions identified based on the scene description. The action prediction model may be trained using each of the plurality of actions derived from the scene description model. In an embodiment, the action prediction model may be trained using Long Short-Term Memory (LSTM) technique. Alternatively, the action prediction model may also be trained using a conditional probability of possible state action change from one state to another state from a sequence of possible states. The threat prediction model may be trained using a plurality of training actions derived from the action prediction model. For instance, an action related to a sequence may be associated with a particular type of threat and the like.

Considering a real-time situation, where the threat prediction system 101 receives the real-time video feed from a video surveillance system of the plurality of video surveillance systems 103. In an embodiment, the video feed may include a plurality of frames associated with a scene captured at a location of the video surveillance system. In an embodiment, each of the plurality of frames may be numbered sequentially for processing. The threat prediction system 101 may identify one or more objects in each of the plurality of sequentially numbered frames using the trained object detection model. For instance, the one or more objects may be a flower, a human, a gun and the like based on the scene.

Further, the threat prediction system 101 generates a scene description for each of the plurality of frames based on the identified one or more objects and context associated with corresponding frames using the trained scene description model. In an embodiment, the scene description may include sentences describing the scene and gestures. The context may include sentences describing the scene along with emotions associated with a user, wherein the user is associated with the one or more objects. In an embodiment, the threat prediction system 101 may use Natural Language Processing (NLP) technique for generating the sentences. In an embodiment, the gestures may indicate actions of the user with the one or more objects and the emotions may indicate the intention of the user such as happy, angry, disgust and the like while performing the actions. From the scene description, the threat prediction system 101 may determine one or more real-time actions for the scene using the trained action prediction model. Thereafter, the threat prediction system 101 may predict one or more potential threats based on the one or more real-time actions using the threat prediction model. The one or more potential threats may be indicated to the users by sending an alert in respective user devices.

Figure 2A:
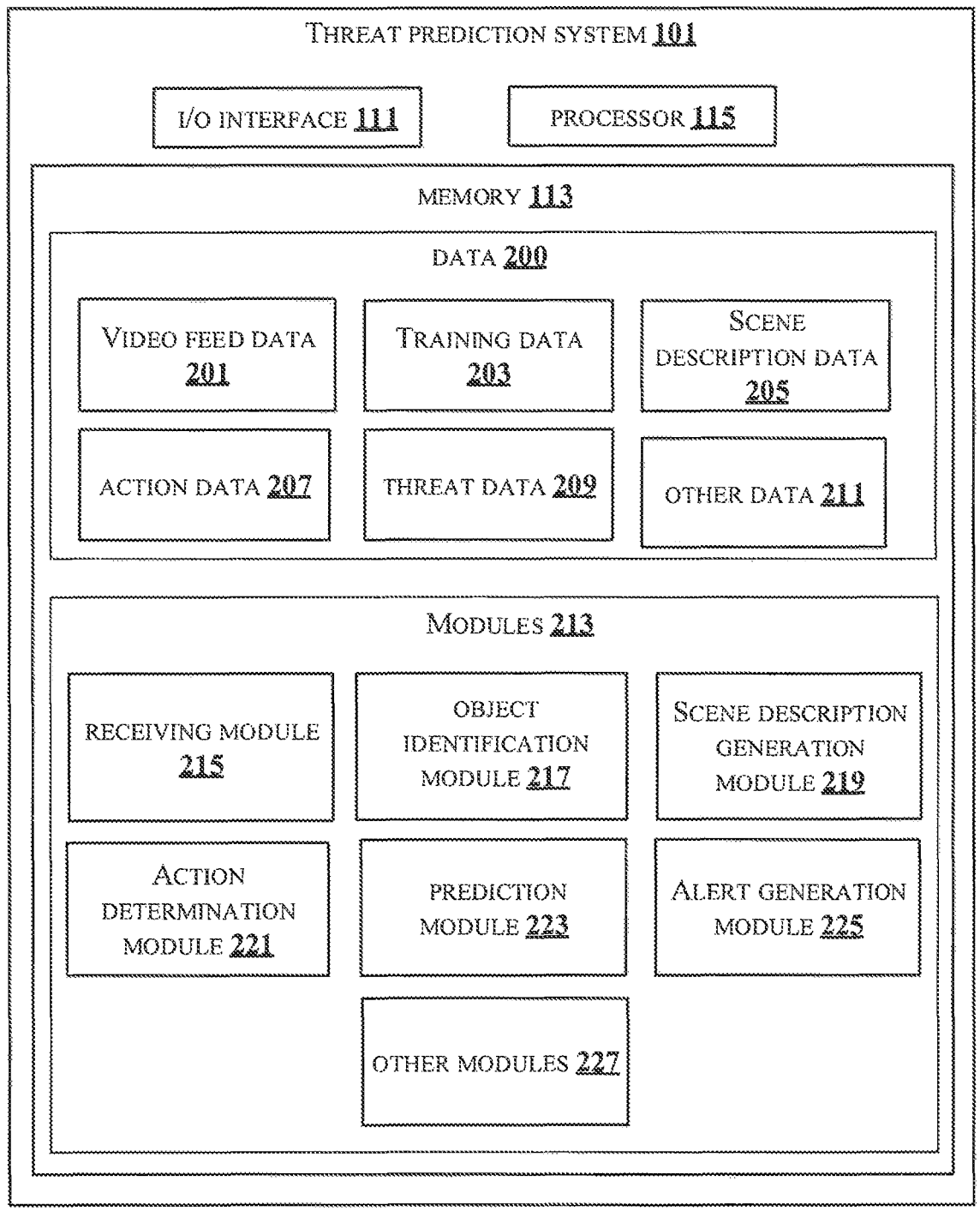
FIG. 2a shows a detailed block diagram of a threat prediction system in accordance with some embodiments of the present disclosure.

FIG. 2a shows a detailed block diagram of a threat prediction system in accordance with some embodiments of the present disclosure.

The threat prediction system 101 may include data 200 and one or more modules 213 which are described herein in detail. In an embodiment, data 200 may be stored within the memory 113. The data 200 may include, for example, video feed data 201, training data 203, scene description data 205, action data 207, threat data 209 and other data 211.

The video feed data 201 may include the real-time video feed received from the plurality of video surveillance systems 103. The video feed data 201 may include a plurality of frames associated with the scene which may be captured by each video surveillance system. For instance, the video feed from a video surveillance system of the plurality of video surveillance systems 103 may be for a bank scene.

The training data 203 may include a plurality of video training feeds which may be associated with different types of scenes. Further, the training data 203 may include a plurality of training objects, a plurality of actions and a plurality of predefined threats identified for the plurality of video training feeds.

The scene description data 205 may include the scene described for each of the plurality of frames associated with the video feed. The scene description may include sentences describing the scene and gestures. Further, the scene description may include sentences describing the scene along with emotions associated with the user, wherein the user is associated with one or more objects in each of the plurality of frames.

The action data 207 may include one or more actions which may be determined from the scene description.

The threat data 209 may include the one or more possible threats to the users. The one or more possible threats may be actions which may harm the users.

The other data 211 may store data, including temporary data and temporary files, generated by the modules 213 for performing the various functions of the threat prediction system 101.

In an embodiment, the data 200 in the memory 113 are processed by the one or more modules 213 present within the memory 113 of the threat prediction system 101. In an embodiment, the one or more modules 213 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 213 may be communicatively coupled to the processor 115 for performing one or more functions of the threat prediction system 101. The said modules 213 when configured with the functionality defined in the present disclosure will result in a novel hardware.

In one implementation, the one or more modules 213 may include, but not limited to a receiving module 215, an object identification module 217, a scene description generation module 219, an action determination module 221, a prediction module 223 and an alert generation module 225. The one or more modules 213 may also include other modules 227 to perform various miscellaneous functionalities of the threat prediction system 101. In an embodiment, the other modules 227 may include an object detection training module, a scene description training module, an action prediction training module and a threat prediction training module. The object detection training module may train the object detection model based on the plurality of training objects identified manually from the sequence frames of the video training feeds using convolution neural network techniques. For instance, the plurality of training objects may be a knife, human, any weapon, and any other components. The scene description training module may train the scene description model using the plurality of training objects. Particularly, the scene description model may describe the scene of each sequential frame. For instance, if a knife and a human is present in the frame, the scene may be described as human holds the knife in hand, which may be considered as an action. Further, the action prediction training module may train the action prediction model using the plurality of actions identified based on the scene description. The action prediction training module may train the action prediction model using each of the plurality of actions derived from the scene description model using Long Short-Term Memory (LS™) technique. Alternatively, the action prediction model may also be trained using a conditional probability of possible state action change from one state to another state from a sequence of possible states. The threat prediction training module may train the threat prediction model using the plurality of training actions derived from the action prediction training module. For instance, an action related to a sequence may be associated with a particular type of threat and the like.

The receiving module 215 may receive the video feed from the plurality of video surveillance systems 103 in real-time. The video feed may include the plurality of frames. Each of the plurality of frames may be numbered sequentially. Equation 1 below shows an exemplary representation of the plurality of frames which are sequentially numbered.

$$IR=(IR_1, IR_2, IR_3, \ldots, IR_n) \quad (1)$$

where $IR_s$=ordered sequence of real-time images such as s=1, 2, 3, . . . , n.

The object identification module 217 may identify the one or more objects in each of the plurality of frames. The object identification module 217 may use the trained object detection model for the identification of the one or more objects. For example, the objects may include, a knife, a gun, humans, or any weapons, or non-human. In an embodiment, each of the one or more objects is sequenced with respect to the received plurality of frames for contextual information. In an embodiment, the contextual information may be identified based on each of the one or more sequential objects. For example, a person is holding a private gun internally or holding the gun in the context of hurting the person. Equation 2 below shows an exemplary representation of sequenced objects derived from each frame.

$$Obj_{Fr1}=(Obj_{11}, Obj_{12}, Obj_{13}, \ldots, Obj_{1n}) \quad (2)$$

Where, $Obj_{11}$, $Obj_{12}$, $Obj_{13}$ are the objects derived from each frame.

In an embodiment, the one or more objects may be identified using the convolution neural network technique.

The scene description generation module 219 may generate a scene description for each of the plurality of frames using the trained scene description model. The scene description generation module 219 may determine the scene based on the one or more objects and context associated with corresponding frames. In an embodiment, the scene description includes sentences describing the scene and gestures. The sentences may be described based on the identified one or more objects in each of the frame using Natural Language Processing (NLP) technique. Further, the context may include sentences which may describe the scene along with emotions associated with the user who may be associated with the one or more objects in the corresponding frames. For instance, the user may be driving a vehicle which may be configured with explosive device for harming a surrounding. The emotion of the users while possessing the one or more objects may be happy, angry, disgust and the like. For example, FIG. 2b shows an exemplary representation of a scene for scene description in accordance with some embodiments of the present disclosure.

Figure 2B:
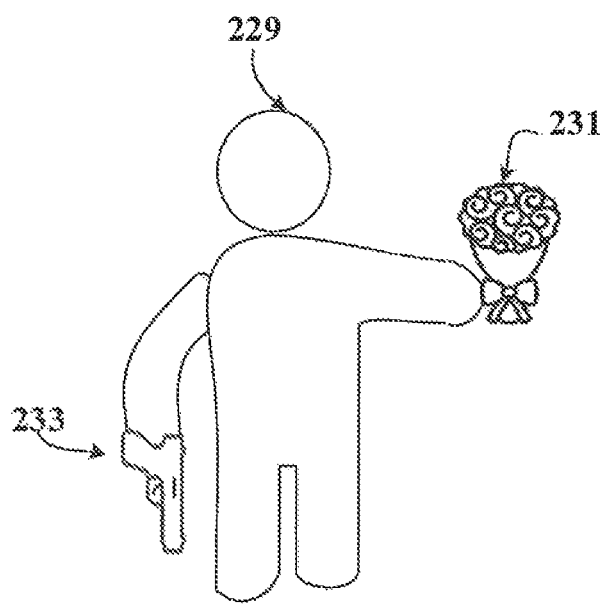
FIG. 2b shows an exemplary representation of a scene for generation of a scene description in accordance with some embodiments of the present disclosure.

FIG. 2b shows a frame of a video feed. The frame includes objects such as a person 229, a bouquet 231 and a gun 233. In such a frame, the scene description generation module 219 may describe the scene as, "a person holding a gun as well as a bouquet". Further, based on the context, the sentence describing the scene along with emotions of the person 229 may be identified as "the person 229 holding bouquet 231 in the left hand and the gun 233 in the right hand". Returning to FIG. 2a, in an embodiment, the scene description may be numbered sequentially. Equation 3 below shows an exemplary representation of sequentially numbered scene description.

$$\{S_1, S_2, S_3, \ldots, S_n\} \quad (3)$$

Where, $S_i$'s i=1, 2, . . . , n are the ordered sequence of sentences.

Where, $S_1=(S_{11}, S_{12} \ldots, S_{1n})$: $S_{1i}$—is the $i^{th}$ sentence extracted from first frame $S_2=(S_{21}, S_{22}, \ldots, S_{2n})$: $S_{2i}$—is the $i^{th}$ sentence extracted from second frame $S_n=(S_{n1}, S_{n2}, \ldots, S_{nn})$: $S_{ij}$—is the $i^{th}$ sentence extracted from the $j^{th}$ frame.

The action determination module 221 may determine one or more real-time actions for the scene based on the scene description using a trained action prediction model. In an embodiment, the action prediction model uses LSTM model which may help in determining next action state sequence. In an embodiment, the plurality of frames along with scene description may be provided to the trained action prediction model. In an embodiment, unique signatures of the actions may be collected as output, where the signatures may be provided to the trained LSTM model. The trained LSTM model may provide description (textual) of the action from combinations of vocabularies. In another implementation, a monolithic deep learning network comprising of a CNN (minus the softmax) and LSTM model may be used for mapping the actions to textual description.

The prediction module 223 may predict one or more potential threats to the user based on the one or more real-time actions using a trained threat prediction model. The prediction module 223 may map each of the one or more real-time actions with a plurality of predefined threats using the trained threat prediction model for predicting the one or more potential threats to the user. In an embodiment, the plurality of predefined threats may be labelled and defined against the plurality of training action sequences using sequential modelling. Equation 4, 5, and 6 shows exemplary representation of threat mapping below.

$$\text{Threat}_1=(S_1, S_2, S_3, \ldots, S_n) \quad (4)$$

$$\text{Threat}_2=(P_1, P_2, P_3, \ldots, P_n) \quad (5)$$

$$\text{Threat}_n=(H_1, H_2, H_3, \ldots, H_n) \quad (6)$$

Where, $\text{Threat}_1$, $\text{Threat}_2$, $\text{Threat}_3$, . . . , $\text{Threat}_n$ may be the plurality of predefined threats associated with each of the plurality of training action;

And $S_1$, $S_2$, $S_3$, . . . , $S_n$; $P_1$, $P_2$, $P_3$, . . . , $P_n$; $H_1$, $H_2$, $H_3$, . . . , $H_n$ are the plurality of training action mapped to each threat respectively.

The alert generation module 225 may generate an alert to the user once the one or more possible threats are predicted. The alert may be notified to the users through respective user devices 105 which may help the users to take preventive actions to control the damage.

Figure 3:
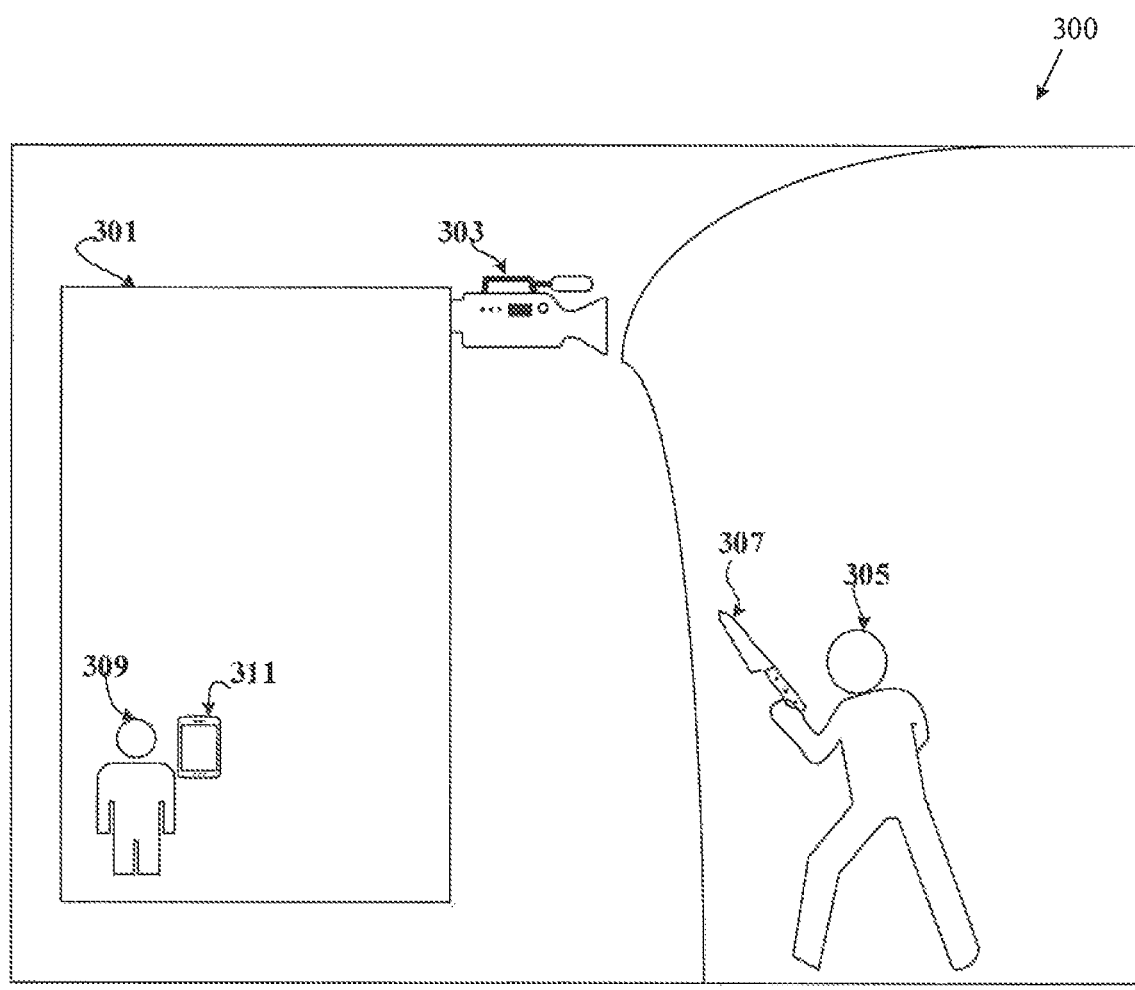
FIG. 3 illustrates an exemplary representation of a scene in a video surveillance system for predicting threats in real-time in accordance with some embodiments of the present disclosure.

FIG. 3 illustrates an exemplary representation of a scene in video surveillance system for predicting threats in real-time in accordance with some embodiments of present disclosure.

Referring now to FIG. 3, an exemplary representation 300 for surveillance of a scene is illustrated. The exemplary representation 300 includes a house 301, a user 309 who is the owner of the house 301. The user 309 may have installed a video surveillance system i.e., a CCTV camera 303 for video surveillance in the vicinity of the house 301. The CCTV camera 303 may be connected to the threat prediction system 101 (not shown explicitly in the FIG. 3). The user 309 is holding a mobile phone 311 for tracking the surveillance of the house 301. Consider, at a particular time, the CCTV camera 303 captures video feed and provide to a threat prediction system 101. The threat prediction system 101 may receive the video feed which may include a plurality of frames captured in the surrounding of the house 301. The threat prediction system 101 may identify one or more objects in each frame using a trained object detection model. Considering the video feed, the one or more objects identified are, a person 305 and a knife 307. In such a case, the threat prediction system 101 may generate scene description by describing the scene in the present case. The scene description herein may contain sentences and gestures using NLP technique as "a person is holding a knife in his hand".

Additionally, the scene description may contain context describing the scene along with the emotions of the person. In the present case, the sentence may be "the person holding the knife with anger". Further, based on the scene description, the threat prediction system 101 may determine a real-time action of the person 305 which may be entering the house 301 of the user 309 to cause harm. Thus, based on the real-time action, the threat prediction system 101 may predict the possible threat which may be "entering the house 301 and causing damage to the user 309 using the knife 307". Thus, based on the prediction, the threat prediction system 101 may alert the user 309 by sending an alarm in the mobile phone 311 for taking preventive actions against the person 305.

Figure 4:
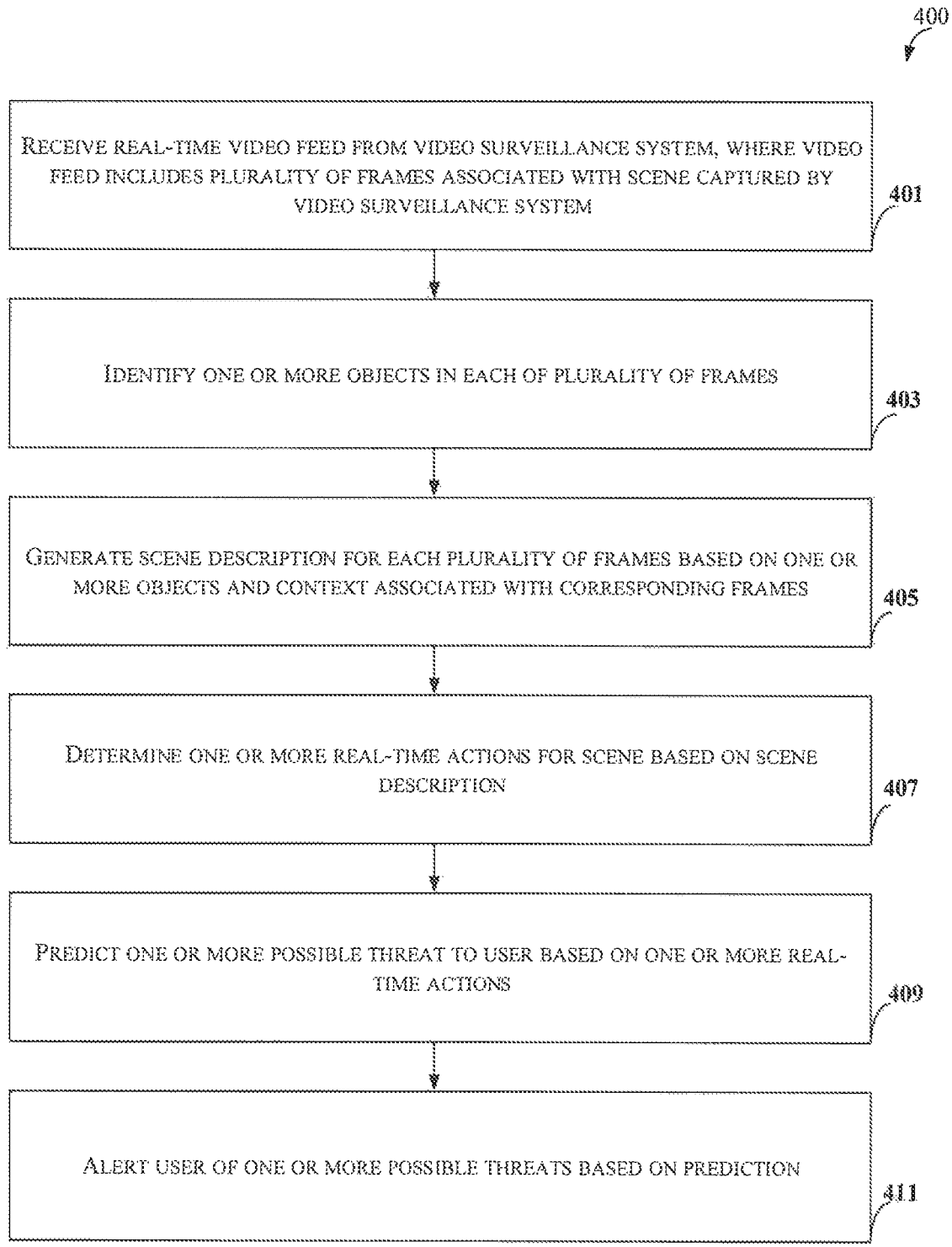
FIG. 4 illustrates a flowchart showing a method for predicting in real-time one or more potential threats in video surveillance in accordance with some embodiments of the present disclosure.

FIG. 4 illustrates a flowchart showing a method for predicting in real time one or more potential threats in video surveillance in accordance with some embodiments of present disclosure.

As illustrated in FIG. 4, the method 400 includes one or more blocks for predicting in real-time one or more potential threats in video surveillance. The method 400 may be described in the general context of computer-executable instructions. Generally, computer-executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, real-time video feed is received by a receiving module 215 from a video surveillance system of a plurality of video surveillance systems 103. In an embodiment, the video feed may include a plurality of frames associated with the scene captured by the video surveillance system.

At block 403, one or more objects in each of the plurality of frames are identified by an object identification module 217. In an embodiment, each of the one or more objects is sequenced with respect to the received plurality of frames.

At block 405, the scene description is generated for each of the plurality of frames by a scene description generation module 219 based on the one or more objects and the context associated with corresponding frames. In an embodiment, the scene description may include the sentences describing the scene and gestures. The context may include the sentences describing the scene along with emotions associated with the user, wherein the user is associated with the one or more objects in the corresponding frames.

At block 407 one or more real-time actions for the scene is determined by an action determination module 221 based on the scene description using a trained action prediction model.

At block 409 one or more potential threats are predicted by a prediction module 223 based on the one or more real-time actions.

At block 411 the user is alerted by an alert generation module 225 of the one or more potential threats based on the prediction.

Figure 5:
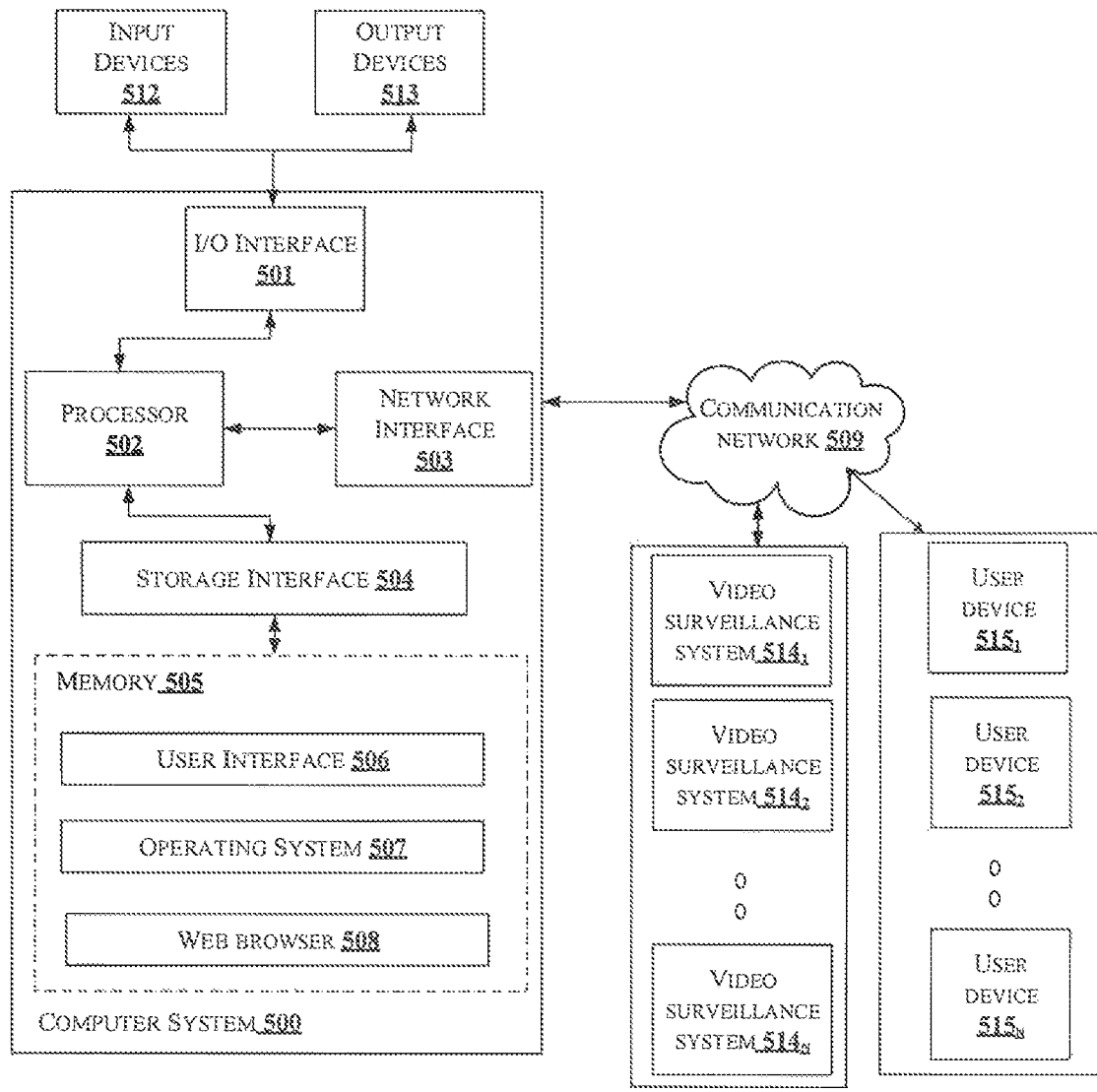
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the threat prediction system 101. The computer system 500 may include a central processing unit ("CPU" or "processor") 502. The processor 502 may include at least one data processor for predicting in real-time one or more potential threats in video surveillance. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices such as input devices 512 and output devices 513. For example, the input devices 512 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 513 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 500 consists of the threat prediction system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11 a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a video surveillance system $514_1$, a video surveillance system $514_2$, ... and a video surveillance system $514_N$ (collectively referred as 514) and a user device $515_1$, ... and a user device $515_N$ (collectively referred as plurality of user devices 515). The network interface 503 may employ connection protocols include, but not limited to, direct connect, Ethernet (e.g., twisted pair 10/100/1000 Base T), transmission control protocol/internet protocol (TCP/IP), token ring, IEEE 802.11 a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to the memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, the computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500.

Examples of operating systems 507 include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, for example, MICROSOFT® INTERNET EXPLORER™, GOOGLE® CHROME™, MOZILLA® FIREFOX™, APPLES SAFARI™, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX™, DHTML™, ADOBES FLASH™, JAVASCRIPT™, JAVA™, Application Programming Interfaces (APIs), etc. In some embodiments, the computer system 500 may implement a mail server (not shown in FIG. 5 explicitly) stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client (not shown in FIG. 5 explicitly) stored program component. The mail client may be a mail viewing application, such as APPLES MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure predicts user action sequence in advance and thus help in predicting multiple threats in different context.

In an embodiment of the present disclosure, the predicted threats help in understanding future damage and raise alerts to users for taking preventive steps to control the damage.

The described operations may be implemented as a method, system or article of manufacture using standard programming and/or engineering techniques to produce software, firmware, hardware, or any combination thereof. The described operations may be implemented as code maintained in a "non-transitory computer-readable medium", where a processor may read and execute the code from the computer-readable medium. The processor is at least one of a microprocessor and a processor capable of processing and executing the queries. A non-transitory computer-readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS:

| Reference number | Description |
| --- | --- |
| 100 | Environment |
| 101 | Threat prediction system |
| 103 | Plurality of video surveillance system |
| 105 | Plurality of user devices |
| 107 | Database |
| 109 | Communication network |
| 111 | I/O interface |
| 113 | Memory |
| 115 | Processor |
| 200 | Data |
| 201 | Video feed data |
| 203 | Training data |
| 205 | Scene description data |
| 207 | Action data |
| 209 | Threat data |
| 211 | Other data |
| 213 | Modules |
| 215 | Receiving module |
| 217 | Object identification module |
| 219 | Scene description generation module |
| 221 | Action determination module |
| 223 | Prediction module |
| 225 | Alert generation module |
| 227 | Other modules |
| 229 | Person |
| 231 | Bouquet |
| 233 | Gun |
| 301 | House |
| 303 | CCTV camera |
| 305 | Person |
| 307 | Knife |
| 309 | User |
| 311 | Mobile phone |
| 500 | Computer system |
| 501 | I/O interface |
| 502 | Processor |
| 503 | Network interface |
| 504 | Storage interface |

-continued

REFERRAL NUMERALS:

| Reference number | Description |
| --- | --- |
| 505 | Memory |
| 506 | User interface |
| 507 | Operating system |
| 508 | Web browser |
| 509 | Communication network |
| 512 | Input devices |
| 513 | Output devices |
| 514 | Plurality of video surveillance systems |
| 515 | Plurality of user devices |

What is claimed is:

1. A method of predicting in real-time one or more potential threats in video surveillance, the method comprising:

receiving, by a threat prediction system, a real-time video feed from a video surveillance system, wherein the video feed comprises a plurality of frames associated with a scene captured at a location of the video surveillance system;

identifying, by the threat prediction system, one or more objects in each of the plurality of frames, wherein each of the one or more objects is sequenced with respect to the received plurality of frames;

generating, by the threat prediction system, a scene description for each of the plurality of frames based on the one or more objects and context associated with corresponding frames, wherein the scene description comprises sentences describing the scene and gestures, and the context comprises sentences describing the scene along with emotions associated with a user, wherein the user is associated with the one or more objects in the corresponding frames;

determining, by the threat prediction system, one or more real-time actions for the scene based on the scene description, wherein the one or more real-time actions are determined using a trained action prediction model which is trained based on a conditional probability of possible state action change from one state to another state from a sequence of possible states;

predicting, by the threat prediction system, one or more potential threats to the user associated with the video feed based on the one or more real-time actions; and alerting, by the threat prediction system, the user of the one or more potential threats based on the prediction.

2. The method as claimed in claim 1, wherein the one or more objects are identified using a trained object detection model, wherein the object detection model is trained using a plurality of video training feeds using convolution neural network technique.

3. The method as claimed in claim 1, wherein the scene description is generated using a trained scene description model, and wherein the scene description model is trained using a plurality of training objects identified for a plurality of video training feeds.

4. The method as claimed in claim 1, wherein the action prediction model is trained using a plurality of actions identified from a plurality of video training feeds.

5. The method as claimed in claim 1, wherein the one or more potential threats are predicted by mapping each of the one or more real-time actions with a plurality of predefined threats using a trained threat prediction model, wherein the threat prediction model is trained using a plurality of training actions.

6. A threat prediction system for predicting in real-time one or more potential threats in video surveillance, comprising:
- a processor; and
- a memory communicatively coupled to the processor, wherein the memory stores processor instructions, which, on execution, causes the processor to:
  - receive a real-time video feed from a video surveillance system, wherein the video feed comprises a plurality of frames associated with a scene captured at a location of the video surveillance system;
  - identify one or more objects in each of the plurality of frames, wherein each of the one or more objects is sequenced with respect to the received plurality of frames;
  - generate a scene description for each of the plurality of frames based on the one or more objects and context associated with corresponding frames, wherein the scene description comprises sentences describing the scene and gestures, and the context comprises sentences describing the scene along with emotions associated with a user, wherein the user is associated with the one or more objects in the corresponding frames;
  - determine one or more real-time actions for the scene based on the scene description, wherein the one or more real-time actions are determined using based on a conditional probability of possible state action change from one state to another state from a sequence of possible states;
  - predict one or more potential threats to the user associated with the video feed based on the one or more real-time actions; and
  - alert the user of the one or more potential threats based on the prediction.

7. The threat prediction system as claimed in claim 6, wherein the processor identifies the one or more objects using a trained object detection model, wherein the object detection model is trained using a plurality of video training feeds using convolution neural network technique.

8. The threat prediction system as claimed in claim 6, wherein the processor generates the scene description using a trained scene description model, and wherein the scene description is trained using a plurality of training objects identified for a plurality of video training feeds.

9. The threat prediction system as claimed in claim 6, wherein the action prediction model is trained using a plurality of actions identified from a plurality of video training feeds.

10. The threat prediction system as claimed in claim 6, wherein the processor predicts the one or more potential threats by mapping each of the one or more real-time actions with a plurality of predefined threats using a trained threat prediction model, and wherein the threat prediction model is trained using a plurality of training actions.

11. A non-transitory computer readable medium including instruction stored thereon that when processed by at least one processor cause threat prediction system to perform operation comprising:
- receiving a real-time video feed from a video surveillance system, wherein the video feed comprises a plurality of frames associated with a scene captured at a location of the video surveillance system;
- identifying one or more objects in each of the plurality of frames, wherein each of the one or more objects is sequenced with respect to the received plurality of frames;
- generating a scene description for each of the plurality of frames based on the one or more objects and context associated with corresponding frames, wherein the scene description comprises sentences describing the scene and gestures, and the context comprises sentences describing the scene along with emotions associated with a user, wherein the user is associated with the one or more objects in the corresponding frames;
- determining one or more real-time actions for the scene based on the scene description, wherein the one or more real-time actions are determined using based on a conditional probability of possible state action change from one state to another state from a sequence of possible states;
- predicting one or more potential threats to the user associated with the video feed based on the one or more real-time actions; and
- alerting the user of the one or more potential threats based on the prediction.

* * * * *